Figures 1, 2, 3:
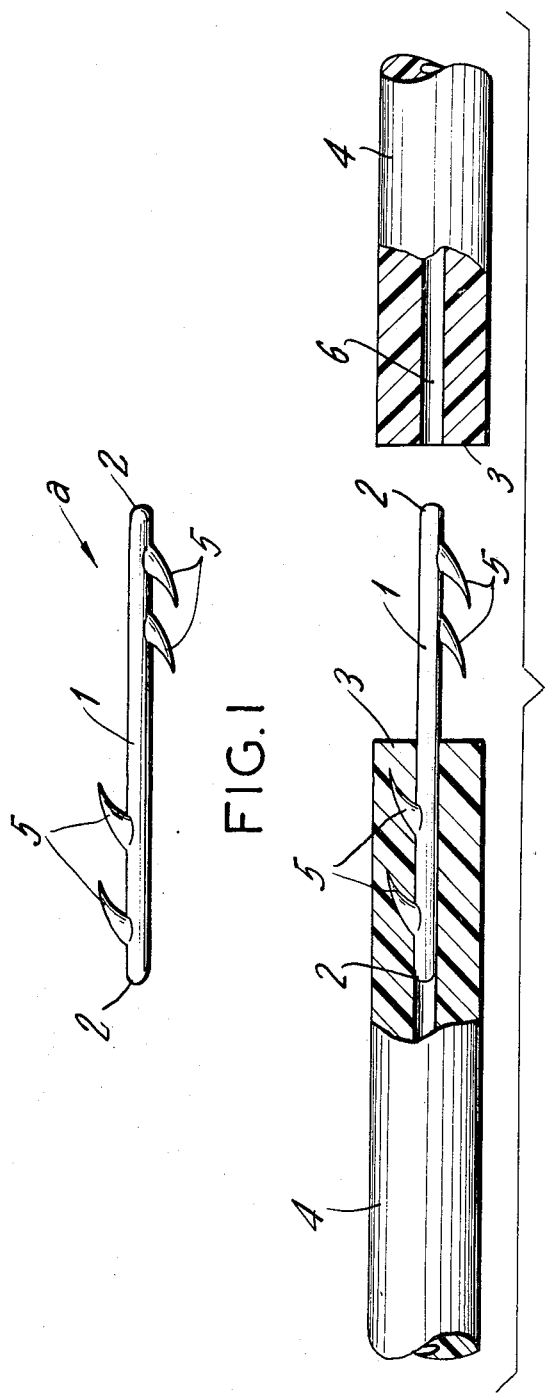

United States Patent [19]
Handl

[11] 3,722,130
[45] Mar. 27, 1973

[54] ELEMENT FOR RAPID JOINT FOR TUBULAR FISHING LINES

[76] Inventor: Ernesto G. Handl, Paso de Los Andes 153, Mendosa, Argentina

[22] Filed: Mar. 12, 1971

[21] Appl. No.: 123,710

[30] Foreign Application Priority Data

Mar. 12, 1970  Argentina..............................227495

[52] U.S. Cl....................43/44.98, 24/123, 24/31 C, 287/127 R, 85/14, 85/21, 287/20.92 E
[51] Int. Cl..........................F16g 11/00, F16g 11/08
[58] Field of Search.....24/123, 87, 31 C, 332, 122.3, 24/122.6, 204; 287/127 R, 20.92 E; 43/44.98, 44.8, 44.2, 43.1; 85/14, 21

[56] References Cited

UNITED STATES PATENTS

| | | | |
|---|---|---|---|
| 567,962 | 9/1896 | Cooper | 24/123 R |
| 3,221,746 | 12/1965 | Noble | 24/123 R |
| 2,712,196 | 7/1955 | Allen | 24/123 R |
| 3,562,871 | 2/1971 | Peterson | 24/31 C |
| 311,883 | 2/1885 | England | 24/31 C |
| 920,808 | 5/1909 | Alcott | 24/123 R |
| 1,378,507 | 5/1921 | Wiegand | 24/31 C |
| 3,309,096 | 3/1967 | Inka | 287/127 R |
| 3,389,046 | 6/1968 | Burress | 287/127 R |
| 3,494,006 | 2/1970 | Brumlik | 24/87 R |

Primary Examiner—Bernard A. Gelak
Attorney—J. B. Felshin

[57] ABSTRACT

This is a rapid action connecting element for tubular fishing lines: This element can be used to repair cut lines and to assemble sections. The element comprises a single flexible pin with rounded ends with barbs at its ends having their point directed toward the central section of the pin. Half the pin is introduced into a hole in one tubular line and the other end of the pin is introduced into an end of another tubular line. Upon pushing the ends of the tubular lines together, they are held connected, by reason of the barbs becoming embedded in the lines.

5 Claims, 3 Drawing Figures

PATENTED MAR 27 1973 3,722,130

INVENTOR.
ERNESTO G. HANDL
BY
J.B. Felshin
ATTORNEY

ELEMENT FOR RAPID JOINT FOR TUBULAR FISHING LINES

The present invention which relates in general to equipment for the sport of fishing, refers in particular to a rapid-action connecting element for tubular fishing lines, the object of which is to provide a large number of advantages for enthusiasts in this sport since, as will be noted from the following specification, the connecting system to which reference is had serves both to repair cut lines and to assemble others by sections of different diameter, which, suitably selected, lend themselves effectively for the carrying out of this sport, using lures such as those formed of the conventional flies.

The fly lines which are at present recognized as giving best results are those formed of a tubular braiding of synthetic fibers, covered on the outside by a plastic film, thus producing a structure of high strength and with a degree of flexibility in accord with the purpose which said line is to serve. These lines, the size of which varies between 0.5 and 2 mm in diameter, consist of two types — one of uniform diameter commonly known as parallel lines and the other, of appreciably higher price than the foregoing, whose diameter decreases towards the free end, which feature has resulted in the name of rat-tail by which it is known among fishing enthusiasts. This last type of line results in improvements over the parallel line since it facilitates the presenting of the fly onto the surface of the water due to the gradual increase in flexibility caused by the tapering towards the end.

Since the cost of the braided rat-tail tubular line is considerably higher than that of the parallel line, in general the fisherman is not financially able to purchase it despite the advantages which it offers, for which reason, he purchases different sections of parallel line of different diameters and connects them in such a manner as to obtain a line having a behavior similar to that of the costly rat-tail.

On the other hand, both those who use the parallel fly line and those who use the original rat-tail or rat-tail constructed in the manner indicated above, find it frequently necessary to repair their cut lines by splices. For this purpose, it should be pointed out that up to now the work involved in making a splice of a synthetic tubular line constitutes a task which must be carried out slowly and with a great deal of patience, it being impossible to effect it at the fishing site itself since the connection of the broken line is effected by a splice which is then covered with several layers of varnish, each of which must be allowed to dry properly and therefore up to the present time, the fisherman whose line is cut sees his fun ruined, since, unless he has a spare line, which is rather improbable in view of their cost, he must bring it for repair or else splice it himself, but he can never do this at the fishing site itself for the reasons mentioned above. For all of these reasons, it is needless to point out that these drawbacks are to the detriment of the sport of fishing since they cause the fisherman to lose enthusiasm and are harmful to the people engaged in the business.

Therefore, in order to provide an effective solution for these problems, there has been developed a rapid connecting element for said tubular lines by which the fisherman himself can in a few minutes connect his line at the fishing site itself. This connecting element, which is generally formed of a toothed pin which can be inserted coaxially into the ends of the line to be connected, provides many advantages in addition to the speed with which it achieves its purpose and in addition to providing a joint of high strength without bulges, which makes it possible for the line to slide easily through the guides of the rod which is not true in the case of the conventional splices made with thread and varnish.

For greater clarity and understanding of the object of the present invention, it has been illustrated in various figures in which the same reference numbers indicate identical or corresponding parts and in which the connector has been shown in one of its embodiments, merely by way of example.

FIG. 1 is a view of the said element shown by itself, in which, it being drawn on a scale several times greater than its actual size, there can be noted the barbs which act as retaining members upon embedding themselves into the inner walls of the line. These barbs will in actual practice be arranged along a single line but to facilitate the description, an effective alternate has been illustrated.

FIG. 2 shows the connector element introduced into one of the ends of the line to be connected, and finally, FIG. 3 shows a cross-section through the line which has already been spliced by the element in question.

As can be noted from the drawing, the said rapid connector consists of a single piece a of approximately 20 mm in length, preferably consisting of tempered steel or else of a plastic material having suitable properties, as a result of which the connector will have an appreciable degree of flexibility. This element a comprises an elongated pin 1, the ends 2 of which are slightly rounded in order to prevent it when introduced through the ends 3 of the tubular fishing line 4 from perforating the side walls thereof and going out of line. The said pin 1 has a central section, which, occupying approximately the middle third of its length, is entirely smooth while both side sections are provided with a set of barbs 5 which, acting as hooking fins have their sharp points directed towards the said central section of the pin. Each set of barbs is preferably formed of at least two units, which can be aligned with respect to the barbs of the other section or else distributed irregularly over different generatrices of the pin 1.

The connector a is used simply in the following fashion: Half of the pin 1 is introduced either directly by hand or else with the aid of pliers into the end 3 of the line 4 to be connected, in such a manner that the pin is housed in the hole 6 which the braiding thereof has, whereupon one proceeds in identical fashion with the other end of the line, pushing the facing ends firmly together, whereupon the connection is already effected since when pull is exerted on the line during its use the barbs 5 embed themselves into the walls thereof, forming a very strong connection, which has duly proven itself in practical tests. Furthermore, in order to improve the strength to an even greater extent, there is nothing to prevent impregnating the connector element with a fast-drying adhesive cement which additional task for all practical purposes does not make this easy connecting system any more complicated.

Of course, when the present invention is carried out in practice, modifications may be made in certain details of construction in the shape of the connector element described, without however going beyond the fundamental principles which are clearly set forth in the following claims.

I claim:

1. A rapid connector element for tubular fishing lines characterized by the fact that it comprises a single solid pin having rounded blunt ends, which has a smooth central section and two side sections contained between the limits of said central section and the respective ends of the pin, each provided with a set of protruding curved, painted barbs, which, acting as hooking fins, are inclined in such a manner that their sharp points are directed towards parallism with the central section of the pin, said pin being of uniform cross section except for said barbs, and having an outer cylindrical surface, and said barbs extending outwardly of said cylindrical surface.

2. A rapid connector element for tubular fishing lines according to claim 1, characterized by the fact that the barbs are irregularly distributed over different generatrices of the pin and are longitudally curved outwardly.

3. A rapid connector element for tubular fishing lines according to claim 1, characterized by the fact that it consists of tempered steel.

4. A rapid connector element for tubular fishing lines according to claim 1, characterized by the fact that it is constructed of flexible plastic material.

5. The structure of claim 1, in combination with a pair of tubular fishing line ends, each receiving one of said side sections, and said barbs penetrating the interior surfaces of said fishing line ends.

* * * * *